United States Patent [19]

Kadlub

[11] Patent Number: 4,768,273

[45] Date of Patent: Sep. 6, 1988

[54] FLOATING NOZZLE MOUNT

[75] Inventor: Thomas E. Kadlub, Cherokee, Ga.

[73] Assignee: Movats Incorporated, Marietta, Ga.

[21] Appl. No.: 40,984

[22] Filed: Apr. 21, 1987

[51] Int. Cl.$^4$ .............................................. B23B 35/00

[52] U.S. Cl. .................................................. 29/281.6

[58] Field of Search ................. 29/426.4, 281.6, 281.1; 408/112; 83/568, 579, 615; 248/638, 560

[56] References Cited

U.S. PATENT DOCUMENTS

| | | | |
|---|---|---|---|
| 1,541,467 | 6/1925 | Bengtsson | 408/112 |
| 2,612,793 | 10/1952 | Timpner | 408/112 |
| 3,217,574 | 11/1965 | Nauta et al. | 83/568 |
| 4,349,301 | 9/1982 | Boyajian | 408/112 |
| 4,473,934 | 10/1984 | Marsac et al. | 29/426.4 |

*Primary Examiner*—Robert C. Watson
*Attorney, Agent, or Firm*—Louis T. Isaf

[57] ABSTRACT

A floating nozzle mount supports the high pressure nozzle of a hydraulic packing extraction tool in a movable, floating relationship relative to the stuffing-box of a pump, compressor, valve, or the like, such that as packing material within the stuffing box rises out of the stuffing box, the high pressure nozzle is progressively moved out of the stuffing box to reduce the possibility of canting and twisting of the packing material.

3 Claims, 2 Drawing Sheets

FLOATING NOZZLE MOUNT

FIELD OF THE INVENTION

The present invention relates generally to the field of equipment for extracting packing rings from a stuffing-box, for example in a pump, a compressor or a valve; and it relates more specifically to nozzle mounting devices for use with hydraulic, packing extracting equipment.

BACKGROUND OF THE INVENTION

The apparently most advanced prior art method and apparatus for extracting packing rings from a stuffing-box is the invention of Marsac et al described in U.S. Pat. No. 1,473,934, and known in the market place as a Hydraulic Packing Extraction Tool. The reader is directed to the Marsac et al patent as background of the industry and for an understanding of the environment of the present invention. With the Marsac tool, a high pressure water jet is discharged by a nozzle from about $\frac{1}{2}$ inch to $\frac{3}{4}$ inch above the packing rings to bore a hole in at least the first ring of packing rings in the stuffing box. This lessens the stress of the ring and the high pressure water, flowing through the hole, is pushed back by the next ring, and lifts the first ring out of the stuffing-box. Since the high pressure of the nozzle makes hand holding difficult, the nozzle is rigidly mounted by clamps in a stationary relationship to the stuffing-box.

The Marsac et al process works well provided the packing is close to the top of the stuffing box. When extracting packing from deep stuffing boxes or the bottom rings from a standard box, the nozzle must be lowered well inside the stuffing box. When the packing rings start to move upward, they come in contact with the stationary nozzle tip which blocks the upward motion of that portion of the packing which has contacted the stationary nozzle. Those portions of the packing ring which are not in contact with the nozzle continue to be pushed upward by the water until the ring is canted within the stuffing-box. Once the ring is canted, the water escapes between the tilted edges of the ring and the box and the ring loses all pressure retention capabilities. This packing must now be extracted by hand. Resetting the nozzle higher will not help because the ability to retain pressure under the packing has been lost.

SUMMARY OF THE INVENTION

Briefly described, the present invention comprises a unique nozzle mount assembly which supports the high pressure nozzle of a prior art extraction tool, such as the Marsac tool, relative to the stuffing-box. The floating nozzle assembly permits the nozzle to back out of the stuffing-box when it is struck by the packing ring and as the packing ring moves upward and out of the stuffing-box. The floating nozzle mount of the present invention includes a track assembly which is removably, yet rigidly attached to the stuffing-box or other appropriate object associated with the stuffing-box. A carriage member rides on the track assembly and the pressure nozzle is rigidly clamped to the carriage member. The floating nozzle mount is mounted to the stuffing-box in such an orientation that the pressure nozzle directs its fluid stream into the packing. In the preferred embodiment, a spring element biases the carriage member toward the bottom end of the track assembly. The track assembly is oriented relative to the stuffing-box such that the carriage member, preferrably, moves along the track along a line parallel to the center line of the stuffing-box cavity. Thus, as the water jet from the nozzle lifts up a packing ring in accordance with the process of the Marsac patent, the ring will strike the nozzle head. As the ring continues to rise, the nozzle, and associated carriage, will be raised along the track assembly, thus allowing the packing ring to reach the top of the stuffing box without binding or canting. The spring member provides sufficient spring force to assure that the nozzle and carriage do not jump or rise up along the track assembly simply in reaction to the force of the water leaving the nozzle tip. Additional spring force is provided to assist in maintaining a uniform contact between the nozzle and packing rings as the rings moves out of the stuffing-box.

Therefore, it is an object of the present invention to provide a nozzle mounting assembly for use with a hydraulic packing extraction tool which provides for automatic movement of the spray nozzle by upward motion of the packing material, to reduce the possibility of canting and twisting of packing rings.

Another object of the present invention is to provide a nozzle mounting apparatus which permits direct contact between the spray nozzle and packing rings during the extraction process.

Yet another object of the present invention is to provide a nozzle mounting apparatus which assists in reducing backspray, pressure loss and water volume during the extraction process.

Yet another object of the present invention is to provide a nozzle mounting apparatus which assists in lessening the amount and effect of contaminated waste water utilized during the extraction process.

Other objects, features and advantages of the present invention will become apparent upon reading and understanding this specification when taken in conjunction with the accompanying drawings.

DETAILED DESCRIPTION OF THE PREFERRED EMBODIMENT

Figure 1:
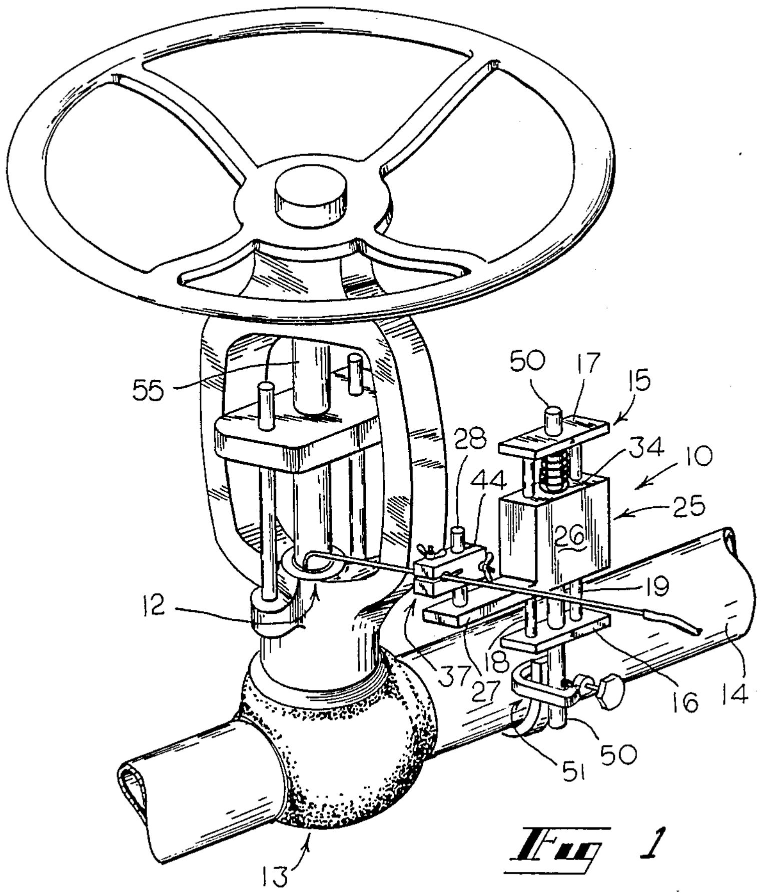
FIG. 1 is a pictorial view of the floating nozzle mount in accordance with the present invention, mounted for use at a valve stuffing-box.
Figure 3:
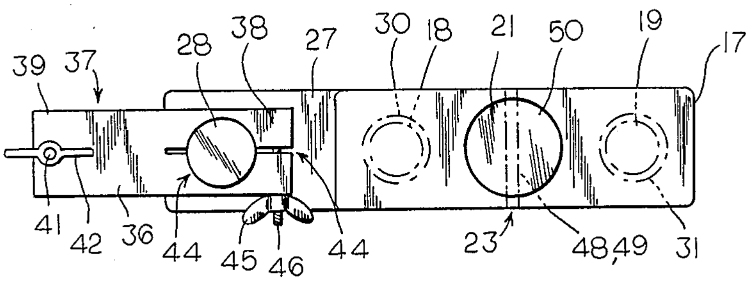
FIG. 3 is a top view of the floating nozzle mount of FIG. 1.
Figure 2:
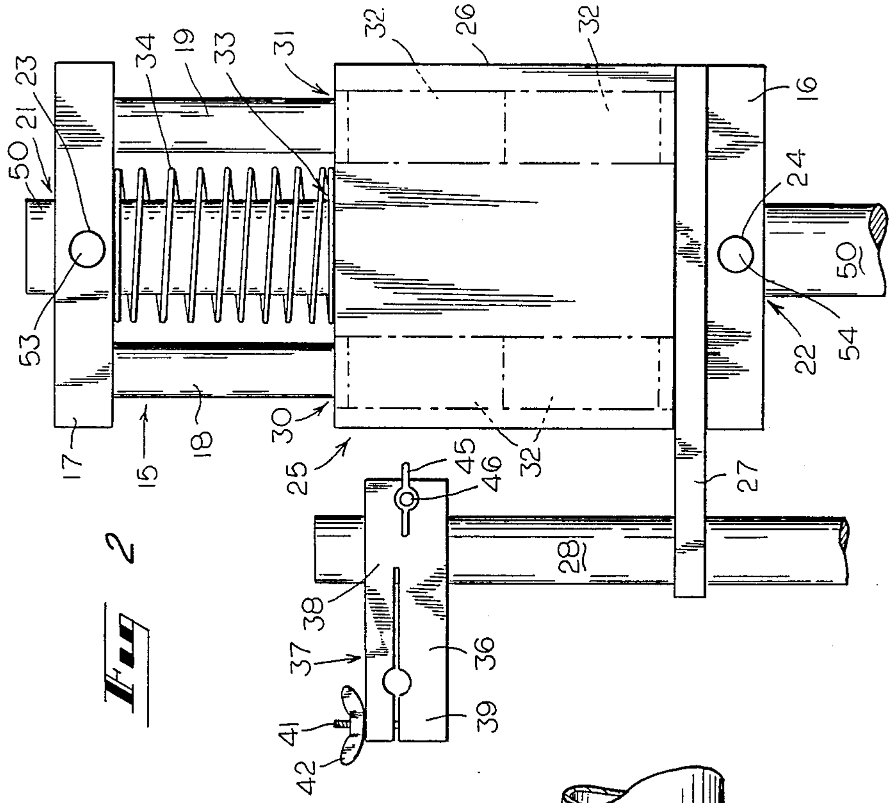
FIG. 2 is a side view of the floating nozzle mount of FIG. 1.

Referring now in greater detail to the drawings in which like umerals represent like components throughout the several views, FIG. 1 shows the floating nozzle mount 10 of the present invention, as it is mounted for use at a stuffing-box 12 of a valve 13. The floating nozzle mount 10 is seen as comprising a track assembly 15, carriage assembly 25, spring member 34 and nozzle holder 37. As seen in FIGS. 1, 2 and 3, the track assembly 15 comprises a base plate 16, top plate 17, and two rod members 18, 19. The top plate 17 and base plate 16 are formed with central openings 21, 22 through the plane of the plate and keyholes 23, 24 bored through the sides of the plates into the central openings. The carriage assembly 25 is comprised of a sliding block 26, extension plate 27 and a post 28. The sliding block is formed with cylindrical side channels 30, 31 and ball bushings 32 occupy the cylindrical side channels 30, 31 (two bushings in each channel), and a cylindrical central channel 33. The sliding block 26 is mounted to the track assembly 15 with the rod members 18, 19 of the track assembly extending through the ball bushings 32 and side channels 30, 31 of the sliding block.

The nozzle holder 37 comprises a post clamp portion 38 and a nozzle clamp portion 39. The nozzle clamp portion 39 includes a split cylindrical passage 40 formed through the body 36 of the nozzle holder 37, as seen in FIG. 2. A threaded post 41 and wing nut 42 control the size of the split cylinder passage 40. The post clamp portion 38 includes a split cylinder passage 44 (as seen in FIG. 3), threaded post 45 and wing nut 42, similar in operation to the nozzle clamp portion 39.

The components of the carriage assembly 25 are rigidly attached to one another; that is, the sliding block 26, extension plate 27 and post 28 are attached together to form an integral unit which slides as one piece along the rod members 18, 19 of the track assembly 15. The carriage assembly 25 is mounted to the track assembly 15 by removing the base plate 16 and sliding the block 26 of the carriage assembly 25 over the two rod members 18, 19 of the track assembly 15. As the support bar 50 is being inserted through the track and carriage assemblies 15, 25, the spring member 34 is inserted in the opening between the two assemblies; and the support bar, thus, extends through the spring member, holding it in place. The base plate is then reattached to the rod members 18, 19. The combined track and carriage assemblies 15, 25 are then mounted at the valve 13 as follows: a support bar 50 is rigidly mounted by pipe clamp 51 to a pipe 14 at the valve 13; the support bar 50 is formed with two key holes 48, 49 (seen in phantom in FIG. 3) which correspond to the key holes 23, 24 of the track assembly 15. The track and carriage assembly 15, 25 combination is mounted to the support bar by sliding the track and carriage assemblies over the support bar 50 with the bar extending through the central opening 22 of the base plate 16, central channel 33 of the sliding block 26 and central opening 21 of the top plate 17. The keyholes 23, 24 are aligned with the keyholes of the support bar and pins 53, 54 are extended through the matched keyholes to lock the track assembly 15 on the support bar 50. The track assembly is locked against movement relative to the support bar. As a result of the above arrangement, the track assembly 15 is now held rigid with respect to the stuffing box 12. That is, the track assembly 15 does not move relative to the stuffing box 12. The carriage assembly 25 does move along the rod members 18, 19 provided the spring force of spring member 34 is overcome. As seen in the drawing, it is preferred that the support bar 50 is mounted to the pipe so as to be parallel to the valve stem 55; and, thus, the carriage assembly 25 moves along the rod members 18, 19 through a plane parallel to the valve stem.

Figure 4:
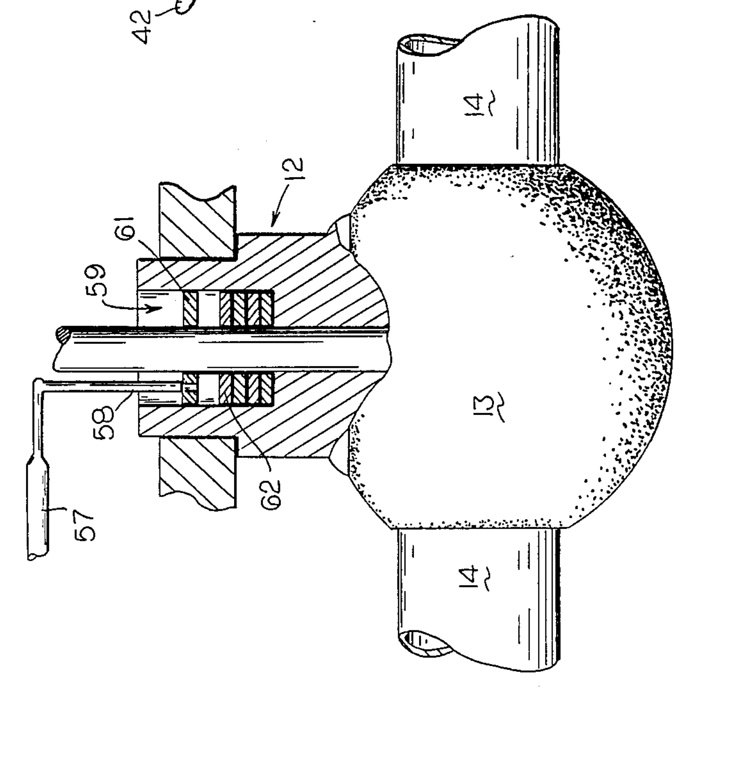
FIG. 4 is a cutaway, isolated view of the stuffing-box of a valve, showing the packing rings within the stuffing-box and a high pressure nozzle mounted in accordance with the present invention.

With the track and carriage assemblies 15, 25 mounted to the support bar 50 at the valve 13, the nozzle holder 37 is connected to the carriage post 28 by the post clamp portion 38. A high pressure nozzle from a hydraulic packing extraction tool is placed in the nozzle clamp portion 39 of the nozzle holder 37. The nozzle 37 is slid back and forth through the cylinder passage 40 of the nozzle holder 37 and the nozzle holder is slid up and down and rotated about the carriage post 28; all to assist in aligning the tip of the nozzle 55 in the stuffing box cavity 59, operation. When proper alignment is achieved, the nozzle holder 37 is tightened in place on the post 28 by the wing nut 46 and the nozzle 57 is tightened in place on the nozzle holder by the wing nut 42. In the preferred method of operation, in accordance with the present invention, the nozzle tip 58 is placed in direct contact with the top layer of packing rings 61. Refer to FIG. 4.

With the floating nozzle mount 10 now mounted in position at the valve 13 and the nozzle tip 58 positioned within the stuffing box 12, preferrably with the tip 58 in contact with the packing ring 61, a high pressure jet of fluid is discharged from the nozzle into the packing as taught by Marsac et al. As the jet cuts through the upper ring, the high pressure fluid is pushed back by the next ring 62 and lifts the top ring 61 out of the stuffing box 12. The ring 61 moves up the stuffing box 12, parallel to the valve stem 55. As the high pressure pushes the ring 61 upward, the fluid pressure is transmitted by the ring 61 to the nozzle 57 to the nozzle holder 37 and carriage assembly 25. The fluid pressure overcomes the spring force of the spring member 34 and the carriage member 25 slides upward along the rod members 18, 19 of the track assembly 15. Thus, as the ring 61 moves upward, the nozzle 57 moves upward with the ring. In the preferred embodiment, a spring member 34 is chosen with sufficient force to assure that the nozzle and carriage do not rise up along the track assembly 15 simply in reaction to the force of the fluid leaving the nozzle tip 58 and, also, to provide an additional force assisting and maintaining a uniform contact between the nozzle tip 58 and the packing ring 61 as the ring moves out of the stuffing box. By way of example only, a spring is sized whereby approximately fifteen pounds of spring force is maintained on the nozzle 57; six to eight pounds of this is overcome by the reaction of the fluid leaving the nozzle tip 58 under approximately 14,000 psi; and the remainder is overcome by the movement of the packing out of the stuffing box 12.

Whereas this invention has been described in detail with particular reference to specific embodiments thereof, it will be understood that variations and modifications can be effected within the spirit and scope of the invention, as described before and as defined in the appended claims.

What is claimed is:

1. In combination:

a stuffing box including, at least a cavity, and a mouth accessing said cavity;

packing material packed within said stuffing box;

a high pressure spray nozzle, including at least a rigid tube, fluid inlet and a fluid outlet, from which fluid is controllably released under pressure from a fluid reservoir;

alignment means for aligning said spray nozzle in a first position with said fluid outlet positioned within said cavity of said stuffing box, said first position being a position from which fluid directed under pressure from said nozzle at said packing material will loosen said packing material and force said packing material to move toward said mouth of said stuffing box, thus pushing against said outlet of said nozzle; and means for providing controlled movement of said spray nozzle away from said first position in response to movement of said packing ring toward said mouth of said stuffing box.

2. Combination of claim 1, wherein said means for providing controlled movement comprises, at least:

force means for maintaining a biasing force biasing said nozzle toward said first position, said biasing force being of such magnitude as to exceed the magnitude of a reactionary force at said nozzle outlet developed in response to said fluid escaping said nozzle outlet under said pressure, and said biasing force being of a magnitude overcome by a combination of said reactionary force and the pushing force of said packing material pushing against said nozzle outlet as result of said loosening and movement of said packing material by said fluid directed under said pressure from said nozzle at said packing material; and means for defining a path to be travelled by said nozzle as it moves away from said first position.

3. Combination of claim 1, wherein said spray nozzle in said first position is oriented with said fluid outlet in contact with said packing material.

* * * * *